United States Patent
Colombo et al.

(10) Patent No.: US 9,593,737 B2
(45) Date of Patent: Mar. 14, 2017

(54) PRESSURE VALVE FOR GAS SPRING

(71) Applicant: GM GLOBAL TECHNOLOGY OPERATIONS LLC, Detroit, MI (US)

(72) Inventors: Joel Colombo, Howell, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/594,704

(22) Filed: Jan. 12, 2015

(65) Prior Publication Data

US 2016/0201754 A1    Jul. 14, 2016

(51) Int. Cl.
  *F16F 9/52* (2006.01)
  *F16F 9/02* (2006.01)

(52) U.S. Cl.
  CPC ............ *F16F 9/526* (2013.01); *F16F 9/0281* (2013.01)

(58) Field of Classification Search
  CPC ........ F16F 9/02; F16F 9/22; F16F 9/36; F16F 9/52; F16F 9/58; F16F 2230/24
  USPC .......................... 188/276, 277, 279; 267/120
  See application file for complete search history.

(56) References Cited

U.S. PATENT DOCUMENTS

| | | | |
|---|---|---|---|
| 3,995,842 A | 12/1976 | Freitag | |
| 4,408,751 A | 10/1983 | Dodson et al. | |
| 5,064,030 A | 11/1991 | Wossner | |
| 5,106,065 A * | 4/1992 | Staton | F16F 9/0209 188/269 |
| 5,722,642 A * | 3/1998 | Bradshaw | A47C 11/00 256/1 |
| 5,735,371 A | 4/1998 | Jobelius et al. | |
| 6,959,921 B2 * | 11/2005 | Rose | F16F 9/526 188/300 |
| 7,484,720 B2 | 2/2009 | Lange et al. | |

* cited by examiner

*Primary Examiner* — Christopher Schwartz
(74) *Attorney, Agent, or Firm* — Cantor Colburn LLP

(57) ABSTRACT

A pneumatic spring strut assembly comprises a cylinder wall defining an interior volume having a working end and a boosting chamber adjacent to the working end, the working end including a first volume of gas and the boosting chamber including a second volume of gas, a piston assembly disposed for reciprocation in the working end of the interior volume, a piston rod having a proximal end secured to the piston and a distal end projecting out of the interior volume, a temperature control valve assembly disposed in the interior volume separating the working end from the boosting chamber and including an engineered portion that is configured to prevent fluid flow between the working end and the boosting chamber while the first volume of gas is present in the working end and to permit fluid flow between the working end and the boosting chamber should the working end be evacuated of the first volume of gas.

16 Claims, 3 Drawing Sheets

PRESSURE VALVE FOR GAS SPRING

FIELD OF THE INVENTION

The subject of the invention is related to multi-chamber, temperature compensated pneumatic spring struts and, more particularly, to a temperature compensating valve assembly having over-temperature compensation.

BACKGROUND

Pneumatic spring struts (gas springs) are widely used to either partly or totally counterbalance engine compartment hoods, trunk lids, rear windows and tailgates of vehicles to facilitate opening them and to hold them open. The force outputs of gas springs may vary considerably with ambient temperature swings. That is, at low ambient temperatures the gas spring produces a force that can be significantly lower than the force produced at higher ambient temperatures. To offset this effect a temperature compensating valve (TCV) assembly is assembled into pneumatic spring strut bodies. The TCV assembly separates the gas chamber of the gas spring into two separate pressure chambers. When the valve is closed, for example at temperatures above 4 degrees C., the gas spring functions only using a main pressure chamber. At cold ambient temperatures, for example at temperatures below 4 degrees C., the valve opens, allowing the gas spring to operate and provide an output, or lift force, based on the volume of gas in the main pressure chamber and an additional volume. The additional volume is contained in a secondary pressure chamber.

In some cases, such as following damage to the vehicle following a crash, gas in the main pressure chamber may escape from the pneumatic spring strut due to leakage around the lift rod seal. In cases in which the pneumatic spring strut temperatures are elevated it is desirable to release the gas pressure in the secondary pressure chamber to prevent it from dislodging the TCV assembly from its seated position in the pneumatic spring strut body.

SUMMARY

In an exemplary embodiment a pneumatic spring strut assembly comprises a cylinder wall defining and interior volume having a working end and a boosting chamber adjacent to the working end, the working end including a first volume of gas and the boosting chamber including a second volume of gas, a piston assembly disposed for reciprocation in the working end of the interior volume, a piston rod having a proximal end secured to the piston and a distal end projecting out of the interior volume, a temperature control valve assembly disposed in the interior volume separating the working end from the boosting chamber and including an engineered portion that is configured to prevent fluid flow between the working end and the boosting chamber while the first volume of gas is present in the working end and to permit fluid flow between the working end and the boosting chamber should the working end be evacuated of the first volume of gas.

In another exemplary embodiment a pneumatic spring strut assembly for a vehicle lift-gate comprises a cylinder and a piston assembly disposed in the cylinder for reciprocation in a working end. The piston has a piston rod secured at one end to the piston and projecting out of the cylinder at a second end. A temperature control valve assembly separates the working end of the cylinder from an adjacent boosting chamber and comprises a partition wall bushing unit fixed inside of the cylinder to define the boosting chamber and the working end and includes a body, a cap, a wall and an engineered portion that is configured to maintain integrity while pressurized gas is present in the working end and the boosting chamber and to allow fluid flow between the boosting chamber and the working end should the working end be evacuated of pressurized gas.

In yet another embodiment, a pneumatic spring strut assembly for a vehicle panel comprises a cylinder wall defining and interior volume having a working end and a boosting chamber adjacent to the working end, the working end including a first volume of gas and the boosting chamber including a second volume of gas, a piston assembly disposed for reciprocation in the working end of the interior volume, a piston rod having a proximal end secured to the piston and a distal end projecting out of the interior volume, a temperature control valve assembly disposed in the interior volume separating the working end from the boosting chamber and including an engineered portion that is configured to prevent fluid flow between the working end and the boosting chamber while the first volume of gas is present in the working end and to permit fluid flow between the working end and the boosting chamber should the working end be evacuated of the first volume of gas.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
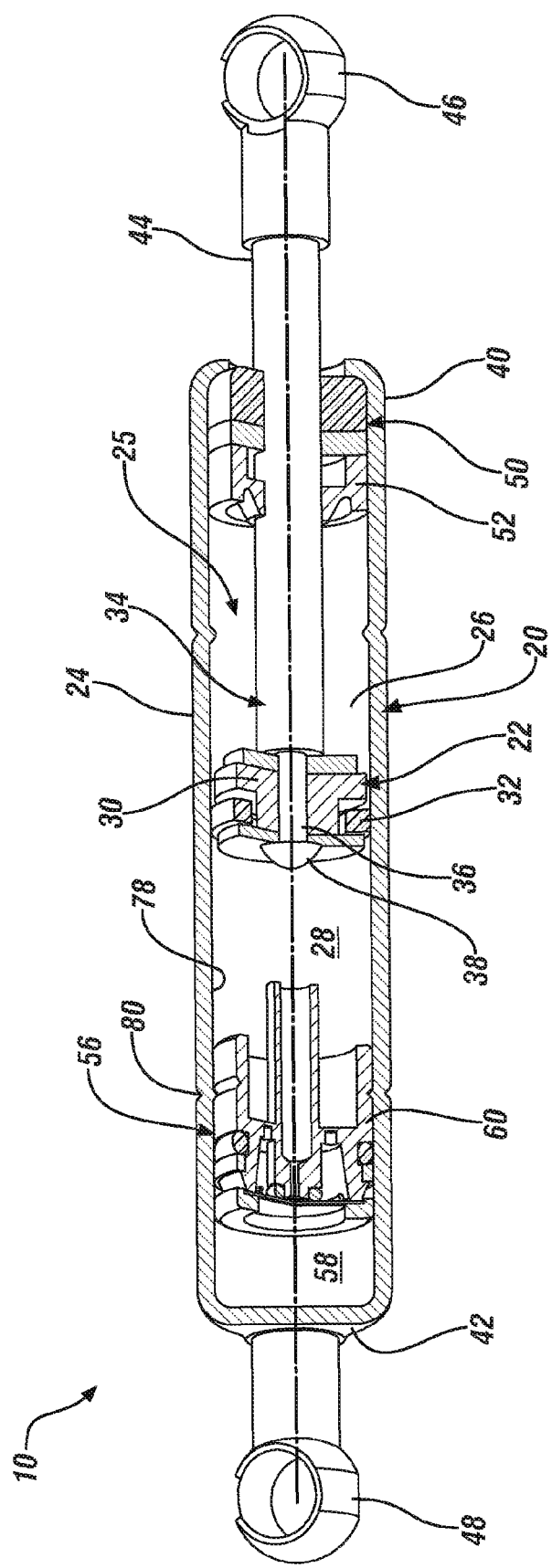
FIG. 1 is a sectional, plan view of a pneumatic spring strut embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a burden. The embodiments shown are applicable to vehicle components, but the system disclosed herein may be used in any suitable applications in which a pneumatic spring strut has application (ex. transportation, energy and aerospace applications, home appliance, home and particularly including many other types of vehicular components and applications).

Referring now to FIG. 1 in an exemplary embodiment, a pneumatic spring strut assembly 10, for use in assisting with opening and maintaining open a vehicle panel, has a cylinder 20 having a cylinder wall 78 defining an interior volume 25 and whose length is determined by the type of equipment with which the spring strut assembly 10 is to be used. A piston assembly 22 is disposed in the cylinder 20 for reciprocation at a first working end 24. The first working end 24 is separated by the piston assembly 22 into two compartments 26 and 28 which are filled with a first volume of gas (e.g., air, nitrogen or some other inert gas) under pressure. The piston assembly 22 may include a free-fitting piston 30, a piston ring 32 and a piston rod or shaft 34 secured at a first, proximal end 36 to the piston by swaging over or riveting at 38.

The piston shaft 34 projects out through a first end 40 of cylinder 20; the second end 42 of which is closed. The second, distal end 44 of shaft 34 has a connector link 46 rigidly secured thereto and a second connector link 48 is fixed to the second end 42 of the cylinder 20. Within the cylinder 20 the piston shaft 34 passes through a large seal 50 and guide package 52. The first end 40 of the cylinder 20 is crimped about the seal 50 and guide package and internal gas pressure helps to maintain the seal in position.

Figure 2:
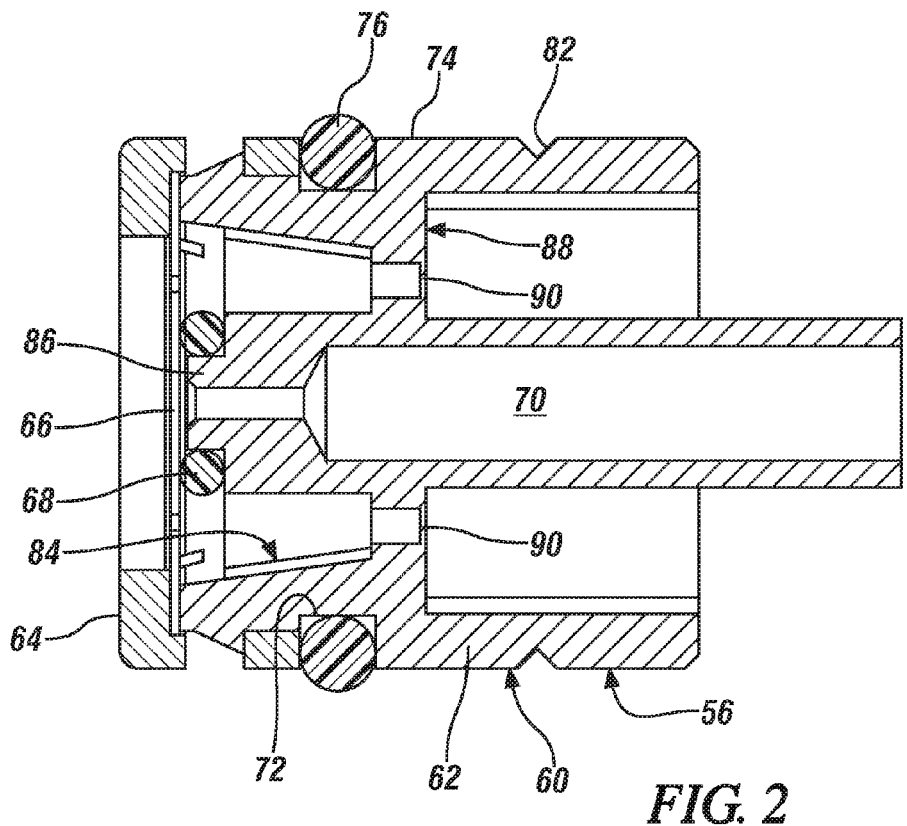
FIG. 2 is a sectional view of a temperature compensating valve assembly embodying features of the invention.

The concept of temperature compensation involves using a temperature control valve "TCV" assembly 56 to separate the first, working end 24 of the cylinder 20 within which the piston reciprocates, from an adjacent boosting chamber 58 containing a second volume of gas under pressure. Referring now to FIG. 2, with continuing reference to FIG. 1, the TCV assembly 56 comprises a partition wall bushing unit 60 which is fixed in a predetermined location inside of the cylinder 20 to define the aforementioned boosting chamber 58. The partition wall bushing unit, or bushing valve 60, may be constructed as shown in FIG. 2 and comprises a body 62 and a cap 64. A valve member such as a bimetallic spring member 66 is retained between the body 62 and the cap 64. An O-ring 68 is located below the bimetallic spring member 66 and seals the bimetallic spring when the TCV assembly 56 is in the closed position against a valve seat 86, as shown in FIG. 2. In the open position (not shown), the bimetallic spring member 66 bends away from, and disengages from the O-ring 68 and valve seat 86 providing an opening to the hollow tube portion 70 which leads to compartment 28 of the working end 24 of the cylinder 20. When ambient temperatures decrease, for example below 4 degrees C., the bimetallic spring member 66 curves away from and disengages from the O-ring 68 and valve seat 86 in the open position (not shown).

The TCV assembly 56 is assembled into the cylinder 20. As shown in FIG. 2, the body 62 comprises a seat 72 extending about the circumference of an outer wall 74 in which a second O-ring 76 is located. The second O-ring forms a seal with the cylinder wall 78 of the cylinder 20. The cylinder 20 may have a tube groove 80 formed therein, typically following the insertion of the TCV assembly into the cylinder. The tube groove 80 interfaces with a circumferentially extending retention notch 82 in the outer wall 74 and operates to maintain the TCV assembly 56 in place in the cylinder 20 and to form an additional seal with the cylinder wall 78 of the cylinder 20. In another embodiment (not shown) the TCV assembly 56 may be press fit into the cylinder 20.

Figure 3:
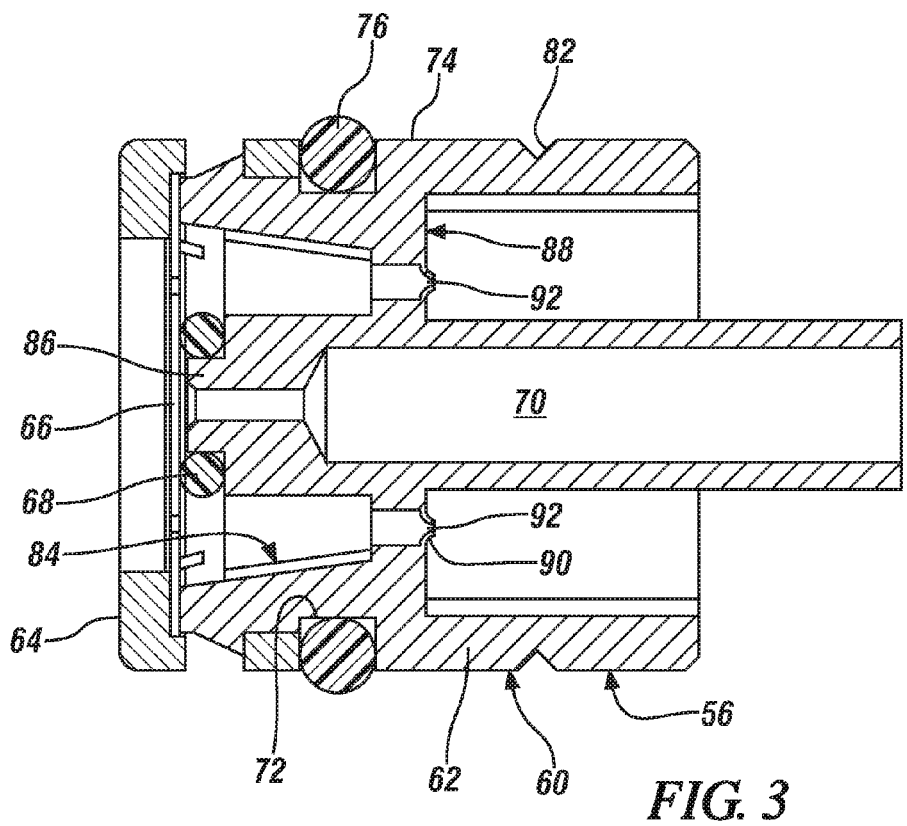
FIG. 3 is another embodiment of a temperature compensating valve assembly embodying features of the invention.
Figure 4:
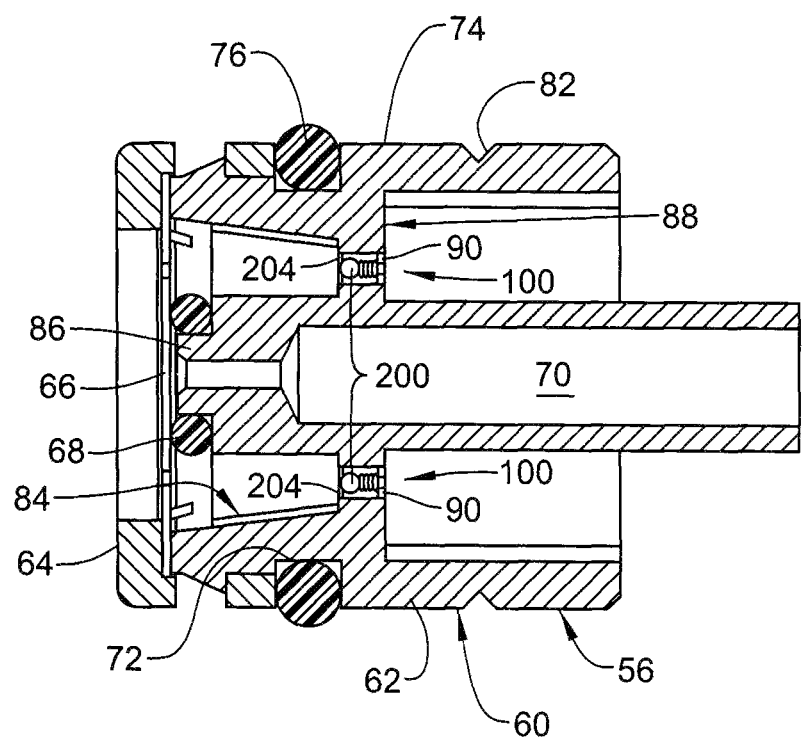
FIG. 4 is yet another embodiment of a temperature compensating valve assembly embodying features of the invention.

In an embodiment, an annular recess 84 surrounds the valve seat 86 upon which the bimetallic spring member 66 is operably positioned. A wall 88 separates the boosting chamber 58 from the working end 24 of the cylinder 20. An engineered portion 90 is disposed in the wall 88 and has a thickness that is configured to maintain integrity during normal operation of the pneumatic spring strut assembly 10. As such, while pressurized gas is present on both sides of wall 88 in compartment 28 and boosting chamber 58 fluid flow of pressurized gas between the first working end 24 and the boosting chamber 58 is prevented. However, should compartment 28 be evacuated of pressurized gas due to a leakage of seal 50 or other leakage event, the engineered portion 90 will yield, or open, (FIG. 3) to release the gas pressure in the boosting chamber 58 thereby avoiding a pressure differential across the partition wall bushing unit 60 that could result in its dislodging from a seated position. By yielding, the engineered portion 90 defines an aperture 92 in the partition wall bushing unit 60 which will permit the fluid flow between the first working end 24 and the boosting chamber 58 to thereby facilitate the harmless escape of the compressed gas from boosting chamber 58.

The pressure differential at which the engineered portion 90 yields, or opens, may be selected to range from the differential between the two chambers 26, 58 at the time of evacuation up to the differential prior to that which is required to dislodge the partition wall bushing unit 60 from its seated position within cylinder 20. The engineered portion 90 may be cast into the partition wall bushing unit 60 or machined-in following casting. In addition, while the partition wall bushing unit 60 is shown with an annular recess 84 surrounding the valve seat 86, such a feature is not necessarily required for proper operation of the engineered portion 90 which may be disposed in a thicker portion of the unit with no reduction in effectiveness. Additionally, while the engineered portion 90 has been illustrated herein as comprising a type of burst wall, a biased check valve 100 such as a spring loaded ball bearing 200 in a valve seat 202 machined in the wall 88 is also contemplated as falling within the scope of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:

1. A pneumatic spring strut assembly comprising:
a cylinder wall defining and interior volume having a working end and a boosting chamber adjacent to the working end, the working end including a first volume of gas and the boosting chamber including a second volume of gas;
a piston assembly disposed for reciprocation in the working end of the interior volume, a piston rod having a proximal end secured to the piston assembly and a distal end projecting out of the interior volume; and
a temperature control valve (TCV) assembly disposed in the interior volume separating the working end from the boosting chamber, the TCV assembly including a valve member responsive to changes in temperature to selectively fluidically connect the working end and the boosting chamber, and an engineered portion that is configured to prevent fluid flow between the working end and the boosting chamber while the first volume of gas is present in the working end and to yield permitting fluid flow from the boosting chamber to the working end should the working end be evacuated of the first volume of gas.

2. The pneumatic spring strut assembly of claim 1, wherein a wall in the temperature control valve assembly separates the boosting chamber the working end.

3. The pneumatic spring strut assembly of claim 2, wherein the engineered portion is disposed in the wall and comprises a portion of reduced thickness.

4. The pneumatic spring strut assembly of claim 3, wherein by yielding, the engineered portion defines an aperture in the wall which permits the escape of the second volume of gas from the boosting chamber.

5. The pneumatic spring strut assembly of claim 3, wherein the engineered portion may be cast into the wall or machined-in following casting.

6. A pneumatic spring strut assembly for a vehicle panel comprising:
- a cylinder;
- a piston assembly disposed in the cylinder for reciprocation in a working end, the piston assembly having a piston rod secured at one end to the piston assembly and projecting out of the cylinder at a second end; and
- a temperature control valve assembly separating the working end of the cylinder from an adjacent boosting chamber, the temperature control valve assembly comprising:
  - a valve member responsive to changes in temperature to selectively fluidically connect the working end and the boosting chamber; and
  - a partition wall bushing unit fixed inside of the cylinder to define the boosting chamber and the working end and comprising a body, a cap, a wall and an engineered portion that is configured to maintain integrity while pressurized gas is present in the working end and the boosting chamber and to yield allowing fluid flow from the boosting chamber to the working end should the working end be evacuated of pressurized gas.

7. The pneumatic spring strut assembly of claim 6, wherein the engineered portion is disposed in the wall and comprises a portion of reduced thickness.

8. The pneumatic spring strut assembly of claim 6, wherein by yielding, the engineered portion defines an aperture in the wall which permits the escape of the pressurized gas from the boosting chamber.

9. The pneumatic spring strut assembly of claim 6, wherein the engineered portion may be cast into the partition wall bushing unit or machined-in following casting.

10. A pneumatic spring strut assembly for a vehicle panel comprising:
- a cylinder wall defining an interior volume having a working end and a boosting chamber adjacent to the working end, the working end including a first volume of gas and the boosting chamber including a second volume of gas;
- a piston assembly disposed for reciprocation in the working end of the interior volume, a piston rod having a proximal end secured to the piston and a distal end projecting out of the interior volume; and
- a temperature control valve (TCV) assembly disposed in the interior volume separating the working end from the boosting chamber, the TCV assembly including a valve member responsive to changes in temperature to selectively fluidically connect the working end and the boosting chamber, and an engineered portion that is configured to prevent fluid flow between the working end and the boosting chamber while the first volume of gas is present in the working end and to yield permitting fluid flow from the boosting chamber to the working end should the working end be evacuated of the first volume of gas.

11. The pneumatic spring strut assembly of claim 10, wherein a wall in the temperature control valve assembly separates the boosting chamber the working end.

12. The pneumatic spring strut assembly of claim 11, wherein the engineered portion is disposed in the wall and comprises a portion of reduced thickness.

13. The pneumatic spring strut assembly of claim 12, wherein by yielding, the engineered portion defines an aperture in the wall which permits the escape of the second volume of gas from the boosting chamber.

14. The pneumatic spring strut assembly of claim 12, wherein the engineered portion may be cast into the wall or machined-in following casting.

15. The pneumatic spring strut assembly of claim 10, the engineered portion comprising a biased check valve.

16. The pneumatic spring strut assembly of claim 15, the biased check valve comprising a spring loaded ball bearing in a valve seat machined in the temperature control valve.

* * * * *